C. S. NYBERG.
VERTICAL TURNING AND BORING MILL.
APPLICATION FILED OCT. 11, 1917.
1,301,303. Patented Apr. 22, 1919.
2 SHEETS—SHEET 1.
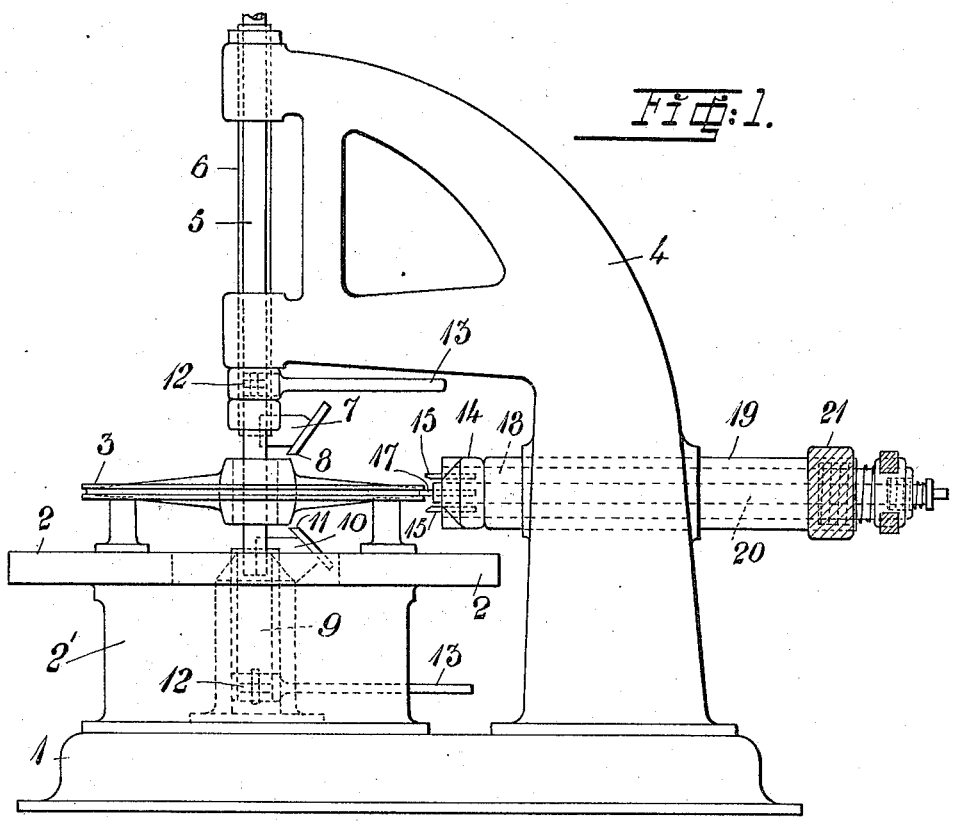
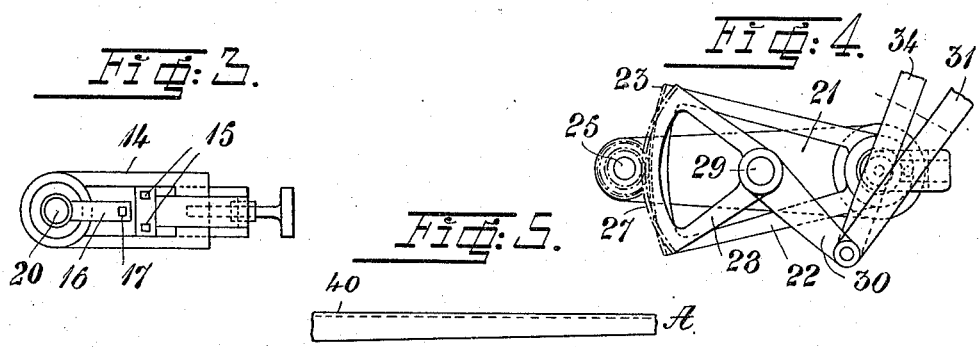
INVENTOR:
Carl Sigfrid Nyberg
By Attys
Fraser, Dusk & Myers C. S. NYBERG.
VERTICAL TURNING AND BORING MILL.
APPLICATION FILED OCT. 11, 1917.
1,301,303.
Patented Apr. 22, 1919.
2 SHEETS—SHEET 2.
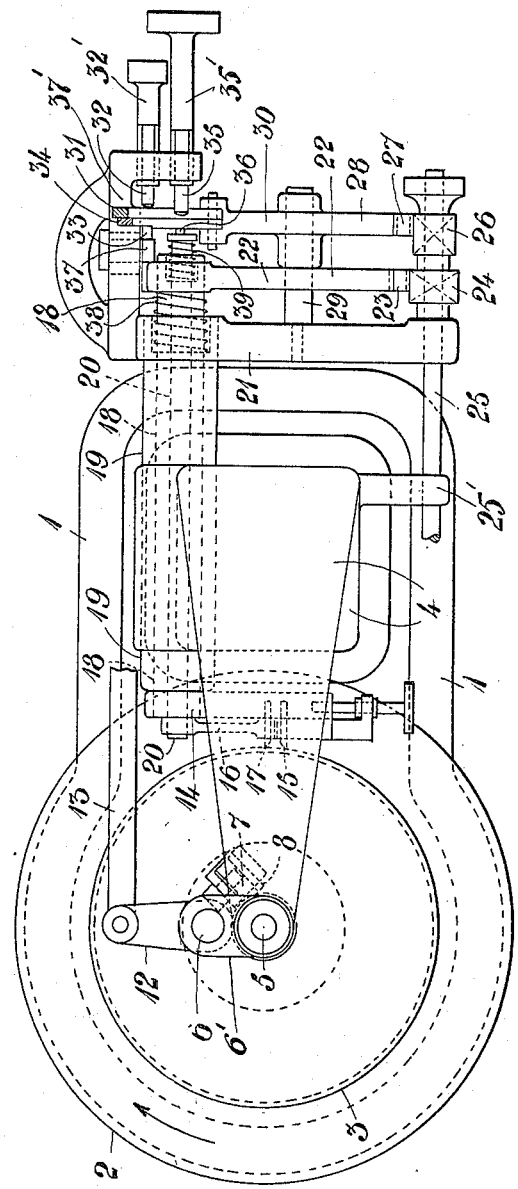
INVENTOR:
Carl Sigfrid Nyberg
By Attys
Fraser, Dent & Myers

UNITED STATES PATENT OFFICE.

CARL SIGFRID NYBERG, OF MELLÖSA, SWEDEN, ASSIGNOR TO AKTIEBOLAGET SVENSKA KULLAGERFABRIKEN, OF GOTTENBORG, SWEDEN, A CORPORATION OF SWEDEN.

VERTICAL TURNING AND BORING MILL.

1,301,303.

Specification of Letters Patent. Patented Apr. 22, 1919.

Application filed October 11, 1917. Serial No. 196,030.

*To all whom it may concern:*

Be it known that I, CARL SIGFRID NYBERG, a citizen of the Kingdom of Sweden, residing at Mellösa, Sweden, have invented new and useful Improvements in Vertical Turning and Boring Mills, of which the following is a specification.

This invention relates in general to vertical turning and boring mills, especially that kind which is adapted for turning and boring circular bodies, as pulleys or the like.

The main object of this invention is to provide a turning and boring mill by means of which a body, for instance a belt pulley, may be turned simultaneously on different sides and the center hole be bored without the necessity of changing the position of the work once fastened in the mill.

Another object of the invention is the provision in a turning and boring mill of that kind of means for adjusting properly the different tools effecting the machining of the work.

With these objects in view the invention consists in the novel features of construction hereinafter fully described, pointed out in the claims and shown in the accompanying drawings, in which—

Figure 1 is a side elevation of a vertical turning and boring mill embodying the present invention, parts being broken away. Fig. 2 is a horizontal view of said mill. Figs. 3 to 5 inclusive are detail views showing different parts of the mill.

Referring to Figs. 1 and 2, 1 is the base plate of the mill, and 2 is the horizontal face plate or table which is supported by a pedestal 2' and to which the work to be turned and bored is secured. Said face plate is adapted to be rotated in the direction indicated by the arrow in Fig. 2 by the aid of any suitable device (not shown in the drawings). The work 3 to be turned shown in Figs. 1 and 2 is the frame of a pulley of the type described in U. S. Patent No. 1,145,078.

Connected with the base plate 1 is an upright 4, the upper portion of which extending across the face plate 2 supports centrally and at right angles to the latter a drill spindle 5. At the side of said drill spindle the upright 4 is provided with projections 6', Fig. 2 (one only of which is shown in the drawings) forming the bearings of a shaft 6 parallel to the spindle 5, said shaft 6 supporting at the lower end a tool holder 7 with a tool 8 for turning the upper side of the boss of the pulley frame 3. Journaled beneath the face plate 2 in the pedestal 2' and coaxially with the shaft 6 is a shaft 9 supporting at the upper end a tool holder 10 with a tool 11 for turning the lower side of the boss of the pulley frame. As will appear from the drawing, the two tool holders 7 and 10 form arms, each extending from a shaft 6 and 9 respectively and connected therewith in such manner, that, by turning the shafts 6 and 9, the tools 8 and 11 may be swung in relation to the work and thus the desired feed of the tools be obtained. In order to effect this feed an arm 12 is secured to each of the shafts 6 and 9, each of said arms 12 being pivotally connected with a rod 13 adapted to be acted upon by any suitable feed mechanism (not shown in the drawing).

To turn the circumference of the pulley frame 3 a saddle 14 is disposed at the inner side of the upright 4, said saddle being adapted to support one or more turning tools. In a pulley frame of the type shown in the drawings the circumference is to be turned in such manner that a contact face supporting the exchangeable pulley rim is obtained. Moreover, a groove is to be turned in the circumference of the pulley frame, such groove serving to take up corresponding extensions disposed on the pulley rim and adapted to center said rim and to keep it in place on the pulley frame. In order that the turning of the contact face and of the groove may be effected simultaneously, there is disposed, besides the saddle 14 supporting tools 15 for turning the contact face, a tool holder 16 independent of the saddle 14 and supporting a tool 17 for turning the groove. As evident from Figs. 1 and 3, the saddle 14 supports two tools 15, one of which is adapted to effect the first rough turning, while the other tool serves to effect the subsequent smooth turning. While turning the contact face, the saddle 14, obviously, is to be fed in such manner that the tools 15 supported by the saddle are moved along the whole width of the contact face, while, on turning the groove, the corresponding tool 17 is to be fed in the radial direction of the pulley frame. Only the means effecting said feed motions form subjects of this invention, whereas the means for fastening the tools and the arrangement of the saddle in other respects may be of any suitable kind.

At the one end the saddle 14 is secured to the one end of a tubular body 18 movable longitudinally and journaled rotatably in a sleeve 19 which is mounted movably in the longitudinal direction but not mounted rotatably in the upright 14. For this purpose the sleeve 19 may, for instance, be provided with a rack (not shown in the drawings) extending longitudinally and passing through a corresponding aperture in the upright 4, said rack engaging a pinion, whose shaft is journaled in the upright and adapted, when rotated, to move the sleeve 19 in the desired direction and thus to adjust the saddle 14 in relation to the circumference of the pulley frame. The tool holder 16 is secured to the one end of a rod 20 journaled rotatably and movably in the longitudinal direction in the tube 18 and the other end of which projects outside the said tube. Secured to the outer end of the sleeve 19 is the one end of a cross-piece 21 forming the frame of a mechanism by means of which the aforesaid feed motions of the tools 15 and 17 are effected.

Said mechanism, which is shown in plan view in Fig. 2 and in end view in Fig. 4, consists of a toothed sector 22 secured to the end of the tube 18 and the toothed portion 23 of which engages a pinion 24 mounted on a shaft 25, which is journaled, in a projection 25′ extending from the upright 4 and in the free end of the cross-piece 21, the said shaft 25 being connected with any suitable gearing actuated upon by the driving means of the mill. Secured to the shaft 25 is another pinion 26 engaging the toothed arc-shaped portion 27 of a sector 28 pivotally mounted on a pin 29 which projects from the cross-piece 21. The sector 28 is provided with an extension forming an arm 30, the free end of which is pivotally connected with two rods, one 31 of which extends upwardly between a stationary pin 32 and a movable pin 33, while the other rod 34 extends upwardly between two similar pins, one 35 of which is stationary, while the other pin 36 is movable. The pin 33 is secured to a sliding piece 37 movable in a slot in an arm 37′ projecting from the cross-piece 21, said sliding piece 37 bearing against the portion of the sector 22 which incloses the end of the tube 18, while the pin 36 is disposed in the end of the rod 20. Inclosing the end of the tube 18 is a spiral spring 38 inserted into a socket formed in the end of the sleeve 19 in such manner that one end of the spring 38 rests against the bottom of said socket, while the other end of the spring rests on the sector 22 thus tending to move the tube 18 to the right, Fig. 2, against the sliding piece 37 and, consequently, to keep the pin 33 in contact with the rod 31. In a similar manner a spiral spring 39 mounted on the end of the rod 20 tends to move said rod to the right and to keep the pin 36 in contact with the rod 34. On turning the sector 28, the rods 31 and 34 are moved longitudinally, and in order that the rods shall be maintained in certain positions in relation to the pins located at each side of the rods, one side of each rod is provided with a longitudinal groove 40, Fig. 5, engaging the end of the corresponding pin 32 or 35. Each of the pins 32 and 35 is secured to a screw 32′ and 35′ respectively screwed into the arm 37′ and enabling the pin to be moved into or out of the corresponding groove 40.

The feed motions of the tools 15 are effected in the following manner. When the sleeve 19 has been moved longitudinally and the saddle 14 together with the tube 18 has been turned in such manner that one of the tools assumes an adjusted position close to the one side of the circumference of the pulley rim, the pinion 24, while the mill is running, turns the sector 22 gradually, the tube 18 thereby being turned and causing first one of the tools and then the other tool to machine the circumference of the pulley frame. At the same time the pinion 26 turns the sector 28, the rods 31 and 34 thereby being moved longitudinally. Owing thereto, the pin 33 and, consequently, also the tube 18 together with the saddle 14 as well as the pin 36, the rod 20 and the tool 17 may perform movements toward or from the center of the pulley frame according to the shape of the corresponding rod 31 or 34. In Fig. 5 different profiles of such rods are shown. A rod in conformity with the evenly narrowing rod A causes, as will easily appear, a uniform motion of the aforesaid members in one direction, a rod B, movements alternately in opposite directions, and a rod C first a stop, further a movement in one direction and finally a return to the first immovable position which then is maintained. Obviously, the shape of said rods may be varied at will.

Besides, the arrangement of the saddle 14 described above affords a considerable advantage of great value even in turning pulleys consisting in that the circumference, as usual in pulleys, becomes convex without further measures, depending on the fact that the saddle 14 oscillates during the turning operation, the tools 15 therefore describing circular arcs around the center of the tube 18 located in the middle plane of the pulley. When one of the tools 15 is positioned in said plane, it is situated at a greater distance from the center of the pulley than in its positions at the ends of said circular arc, that is to say, at the edges of the rim of the pulley, and on account thereof said convexity will be the result. The convexity may be increased or reduced by adjusting the tools 15 at a greater or smaller distance from a plane passing the center of the body to be turned at right angles to the plan of oscillation of the saddle.

Obviously, bodies may be readily and accurately finished in a mill of the construction described above, since one fixing only of the body in the mill is necessary and because all points to be turned may be machined at the same time.

Having now particularly described and ascertained the nature of my said invention and in what manner the same is to be performed, I declare that what I claim is:

1. In a vertical turning and boring mill the combination of a horizontal rotatable table supporting the body to be machined, a tool holder disposed above the said body, another tool holder disposed beneath the body, tool holders disposed at the circumference of the body, and a drill spindle disposed coaxially with the axis of the table.

2. In a vertical turning and boring mill, the combination of a horizontal rotatable table supporting the body to be machined, a tool holder disposed above the said table, another tool holder disposed beneath the table, tool holders disposed at the circumference of the body, and a drill spindle coaxial with the axis of rotation of said table, said tool holders being adjustable in relation to said body.

3. In a vertical turning and boring mill, especially adapted for machining pulleys and the like, the combination of a horizontal rotatable table supporting the body to be machined, a drill spindle coaxial with the center of rotation of said table, a tool holder disposed above the said body, and another tool holder disposed beneath the body, said tool holders being swingable about an axis parallel to the axis of said drill spindle.

4. In a vertical turning and boring mill, especially adapted for machining circular bodies, such as belt pulleys, the combination of a horizontal rotatable table, supporting the body to be machined, a drill spindle coaxial with the center of rotation, of said table, a tool holder disposed above the said body, another tool holder disposed beneath the body, rotatable shafts parallel to said drill spindle and supporting said tool holders, tool holders disposed at the circumference of the work, and means supporting the latter tool holders and adapted to move them against and from the work.

5. In a vertical turning and boring mill, especially adapted for machining circular bodies, such as belt pulleys, the combination of a horizontal rotatable table supporting the body to be machined, a drill spindle coaxial with the center of rotation of said table, a tool holder disposed above said body, another tool holder disposed beneath the body, rotatable shafts parallel to said drill spindle and supporting said tool holders, tool holders disposed at the circumference of the work, and members supporting the latter tool holders and movable in radial direction of the work.

6. In a vertical turning and boring mill especially adapted for machining circular bodies, such as belt pulleys, the combination of a horizontal table supporting the body to be machined, a tool holder disposed above said body, another tool holder disposed beneath the body, tool holders disposed at the circumference of the body, and rotatable members movable in radial direction of the body, and each supporting one of the latter tool holders.

7. In a vertical turning and boring mill, especially adapted for machining circular bodies, such as belt pulleys, the combination of a rotatable table supporting the body to be machined, a tool holder disposed above said body, another tool holder disposed beneath the body, tool holders disposed at the circumference of the body, rotatable members movable in radial direction of the body and each supporting one of the latter tool holders, a gearing driven by a rotating shaft and adapted to rotate one of said supporting members, another gearing driven by the said shaft, and adjustable members actuated by the latter gearing and adapted to move the said supporting members in the said radial direction.

8. In a vertical turning and boring mill, especially adapted for machining circular bodies, the combination of a horizontal rotatable table supporting the body to be machined, a drill spindle coaxial with the center of rotation of said table, a tool holder disposed above said body, another tool holder disposed beneath the body, rotatable shafts parallel to said drill spindle and supporting said tool holders, tool holders disposed at the circumference of the body, rotatable members movable in radial direction of the body and each supporting one of the latter tool holders, a gearing driven by a rotating shaft and adapted to rotate one of said supporting members, another gearing driven by said shaft, and adjustable members actuated by the latter gearing and adapted to move the said supporting members in the said radial direction.

In testimony whereof I have signed my name.

CARL SIGFRID NYBERG.